Jan. 5, 1971   J. HESEDING   3,552,191
METHOD OF TESTING WORKPIECES BY MEANS OF ULTRA-SOUND WAVES
ACCORDING TO THE IMPULSE ECHO METHOD
Filed Jan. 30, 1968   5 Sheets-Sheet 2

Inventor:
Josef Heseding
By Walter Becky

Jan. 5, 1971  J. HESEDING  3,552,191
METHOD OF TESTING WORKPIECES BY MEANS OF ULTRA-SOUND WAVES
ACCORDING TO THE IMPULSE ECHO METHOD
Filed Jan. 30, 1968  5 Sheets-Sheet 4

Inventor:
Josef Heseding
By
Walter Becker

Inventor:
Josef Heseding 3,552,191
METHOD OF TESTING WORKPIECES BY MEANS
OF ULTRA-SOUND WAVES ACCORDING TO
THE IMPULSE ECHO METHOD
Josef Heseding, Essen, Germany, assignor to Ruhrgas
Aktiengesellschaft, Essen, Germany
Filed Jan. 30, 1968, Ser. No. 701,580
Claims priority, application Germany, Jan. 31, 1967,
R 45,162
Int. Cl. G01n 29/04
U.S. Cl. 73—67.7                                  7 Claims

ABSTRACT OF THE DISCLOSURE

A method of and apparatus for non-destructively examining workpieces, especially welding seams, by means of ultra-sound waves according to the impulse-echo method, in which ultra-sound waves are emitted from at least two separate ultra-sound emitter-receiver angular testing heads and sent into the workpiece zone to be examined in such a way that the sound waves of said emitter-receivers meet in said zone while said emitter-receivers are so spaced from the workpiece zone to be examined that the sound waves from one emitter-receiver require more time to reach the workpiece zone to be examined than the sound waves from the other emitter-receiver, means being provided for recording echoes received by said emitter-receivers.

---

The present invention relates to a method of and apparatus for examining workpieces by means of ultra-sound waves according to the impulse-echo method without the necessity of destroying the workpiece.

Material defects or errors in production as, for instance, tears, pores, slag enclosures, etc., are liable to affect the desired properties of workpieces, above all, the strength thereof, so that the strength of the workpiece may be endangered. Especially with workpieces which are to be subjected to high stresses and which must be flawless and have a high strength, tests are conducted in order to discover any possible flaws not noticeable by the naked eye or microscope, and it is necessary to discover such flaws or errors without destroying the workpiece. Well-known fields in which such tests are to be conducted are, for instance, boiler walls, pipelines, walls of pressure containers and especially the testing of welding seams. The best known and most frequently employed methods of testing workpieces without destroying same are irradiation while employing isotopes and ultra-sound. The ultra-sound testing method primarily employs the impulse-echo method.

The present invention concerns a method and apparatus for examining workpieces without destroying same, especially welding seams, by means of ultra-sound waves according to the impulse-echo method. Inasmuch as the impulse-echo method is well known in the art and well covered in the technical literature, the impulse-echo method will be described herein only as far as is necessary for improving the understanding of the present invention and the terminology employed in connection therewith. In connection with the ultra-sound testing method, a testing device is employed which is connected by electric lines with one or more testing heads to be placed upon a workpiece and comprising one or more electro-acoustic converters adapted to convert electrical energy into acoustic energy and/or to convert inversely acoustic energy into electric energy.

Thus, there are emitter testing heads which only emit sound waves, and there are receiver testing heads which only receive sound waves, and there are also emitter-receiver testing heads which emit as well as receive sound waves. Where in the following description nothing is said to the contrary, a testing head is always intended to mean an emitter-receiver testing head. Electric energy is conveyed from the testing device to the testing head, is converted into sound energy, and the ultra-sound rays are emitted from the testing head into the workpiece. Inversely, the testing head is adapted to receive sound rays and to convert the sound energy into electric energy which is conveyed back to the testing device. If it is intended to introduce the sound at an angle of from 0 to 90° with regard to the surface of the workpiece into the latter, for this inclined intonation an angular test head is employed the emitting angle of which corresponds to the angle at which the sound is to be introduced into the workpiece.

According to the impulse-echo method which is involved in the present invention, ultra-sound impulses are by means of an angular test head intonated into the workpiece at an incline. When sound rays in the testing zone, i.e. in the local range of the workpiece, which range is to be covered by the ultra-sound test impact upon a reflecting surface, for instance upon a tear, there will be formed an echo. "Echo" means a sound impulse which is reflected by a surface and is returned to the test head or by means of a reflecting surface is mirrored to an adjacent testing head.

In explaining the difference between "reflecting" and "mirroring" it may be added that sound waves emitted, for instance, in mountain areas by a source of sound are "reflected" by mountain walls and return to the source of sound. Similarly, a sound impulse emitted by a testing head is reflected by a surface back to the same testing head.

On the other hand, a light beam emitted by a light source and hitting a mirror at an angle is mirrored at an angle of substantially the same magnitude but in different direction so that it will not return to the said light source. Similarly, in the present case a sound impulse emitted by a testing head may by a reflecting surface be mirrored onto a testing head other than the one which emitted the said sound impulses.

The received echoes, and more specifically the transmitting time for the sound waves are indicated by the testing device. To this end, as a rule, a visual reproduction is employed by making the impulses visible in the form of an oscillogram by means of a cathode ray or electron beam tube, also called "Braun" tube. The distance between the emitting impulse and the echo in the oscillogram on the Braun tube corresponds to the transmitting time for the sound waves, and this distance can be so adjusted that it corresponds to the distance between the testing head and the reflecting surface in the workpiece. For the contemplations to be made in the following description, it may be assumed, approximately, that for the deviation of the sound rays by a reflecting surface, the law will apply: "angle of incidence equalling angle of reflection or emergence."

The heretofore known methods when employing the impulse-echo method and the method according to the present invention will, solely for purposes of a better understanding and simplicity, be described by way of example in connection with the testing of welding seams. However, it is to be understood that the invention as it will be described is equally applicable to any other workpieces and for any other testing zones of such workpieces.

In connection with the ultra-sound testing of welding seams according to the impulse-echo method, it is known to move an angular testing head manually in spaced relationship to the welding seam parallelly to the latter while at the same time continuously moving the testing head closely to the seam and then again away from the seam so that the testing head will be passed alongside the seam and along a zigzag line while the welding seam will be intonated from the side. The sound waves will be reflected by faulty areas in the welding seam, and the echo received by the testing head will on a screen of the testing device produce an amplitude.

It is also known to arrange two angular testing heads at an angle with regard to each other so that their sound rays form an angle with regard to each other. The two testing heads are equally spaced with regard to the welding seam and accordingly also have identical radiation angles so that their sound rays meet each other in the welding seam, i.e. in the testing zone. The testing heads may be arranged on the same side or on both sides of the welding seam. With this arrangement, the radiated sound waves emitted by a testing head are reflected by faulty areas and are mirrored to the other testing head, or vice versa so that an echo appears on the screen.

For purposes of testing very thick welding seams, it has been known to employ two angular testing heads with identical radiation angles of which one testing head is only an emitter head whereas the other testing head is only a receiving head. The two testing heads are arranged at an angle with regard to each other and are located on guiding rails at different distances with regard to the welding seam and are connected to each other by an endless Bowden wire. If now, one of the testing heads is moved toward the welding seam, the other testing head will automatically move away to the same extent from the welding seam so that the total of the distances of the two testing heads from the welding seam will always remain consant. The testing zone will be displaced from the top downwardly or vice versa in the welding seam, which welding seam in this way can be successively covered over its entire thickness by the testing operation. It has also been suggested, in connection with the above-mentioned testing method, to employ two emitter-receiver testing heads in order for inclined faulty areas to obtain the additional advantage of optimum reflection conditions, because up to three echoes with different transmitting times can be obtained for such errors or faults, and there would exist the possibility to better interpret the echo height with regard to the orientation of the errors or faults.

All heretofore known testing methods have the drawback that with occurring faults in the material, as a rule only a single echo is produced and reproduced on the screen, so that it is very difficult to distinguish between the different types of flaws and, as a matter of fact, it is not always possible to make such differentiation. Such types of flaws are, for instance, pores or slag enclosures or other faulty enclosures, tears or notches, bonding flaws by a non-effected connection of the welding material with the basic material of the welded workpiece, non-welded-through seam roots, etc., which will be discussed more in detail further below.

Additionally, it may be mentioned that echoes occur not only on faulty areas but echoes are also indicated on the screen by reflecting areas which are due to the particular shape of the workpiece being tested. Such reflection areas, due to shape, are, for instance, a seam sag on a welding seam which is sagging, for instance, in the interior of a pipeline, a crown or a weld bead, sagging areas on opposite wall thicknesses, etc., which likewise will be discussed more in detail further below. From the distance of the testing head and its location with regard to the welding seam, from the type, the height and the location of the echo indication, from the shape of the amplitude and from the behavior of the echo indication, an experienced operator will, when a change in the position of the testing head occurs, frequently only with limitations be able to reach conclusions concerning the type of the reflection area. Thus, it is not always possible to differentiate between echoes caused by the shape and echoes caused by flaws of the workpiece.

It is, therefore, an object of the present invention to provide a testing method which will result in a clearer interpretation of echoes caused, by flaws, and will also make it possible better to distinguish such last-mentioned echoes from echoes caused by the shape of the workpiece to thereby avoid any unnecessary destruction of the workpiece or repair work for remedying erroneously assumed faulty areas.

It is another object of this invention to provide an improved testing method which will permit a clearer and safer recognition and differentiation of the different types of flaws in the workpiece being tested in order also in this respect to avoid unnecessary repair work. In this connection, it may be mentioned that in many instances, for instance small pores or slag enclosures do not harmfully affect the workpiece to such an extent that a repair at such areas is necessary. On the other hand, for instance, tears due to a dangerous notch effect will under all circumstances require repair work. A disturbance-free ultra-sound testing requires an error-free coupling, which means the establishment of a connection between the testing head and the workpiece for introducing the sound into the workpiece.

It is, therefore, a further object of this invention, with the method according to the present invention, to create a reliable control possibility to make sure that a proper coupling has been established. The establishment of such coupling will cause difficulties, especially when the testing head has to be guided over an arched surface, for instance, along a round welding seam extending around a pipeline by which welding seam the two pipes have been welded together.

Therefore, it is still another object of this invention to provide an apparatus for carrying out the method according to the invention, as set forth in the preceding paragraphs.

These and other objects of the present invention will appear more clearly from the following specification in connection with the accompanying drawings, in which.

Figure 3:
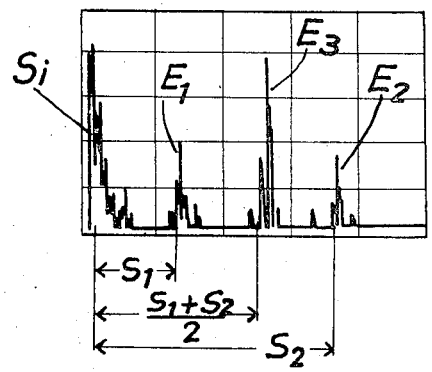
Figure 4:
Figure 5:
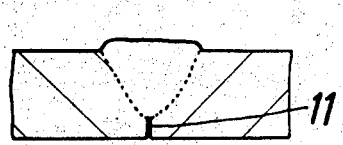
Figure 6:
Figure 7:
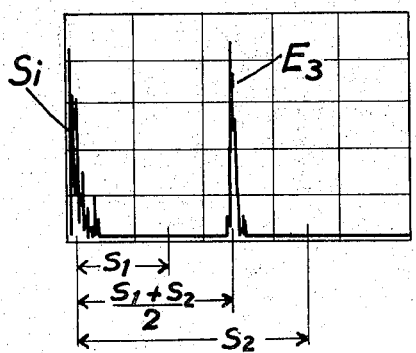
Figure 8:
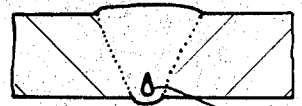
Figure 9:
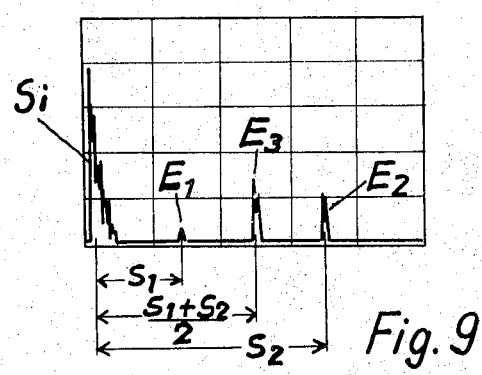
Figure 10:
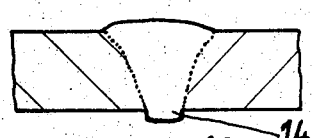
Figure 11:
Figure 12:
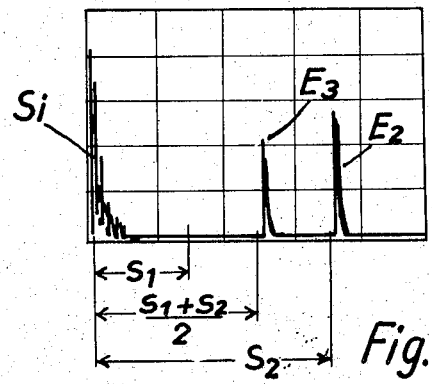

FIG. 3 diagrammatically illustrates the screen of a testing device employed in connection with the present invention;

FIG. 4 shows a portion of two workpieces interconnected by a welding seam which is faulty inasmuch as no proper bonding has occurred;

FIG. 5 is a section similar to FIG. 4 in which the welding seam is faulty inasmuch as it does not extend through the entire area to be joined;

FIG. 6 shows portions of two workpiece sections to be welded together, which welding, however, is faulty inasmuch as the lower edge of one of the workpieces is not contacted by the seam and is offset with regard to the adjacent lower edge of the other workpiece;

FIG. 7 shows a screen indicating the conditions in FIGS. 4, 5 and 6;

FIG. 8 is a section through a faulty weld inasmuch as it shows pores in the welding seam;

FIG. 9 is a screen picture indicating the faulty condition of FIG. 8;

FIG. 10 shows reflection areas caused by the particular shape, for instance the crown of a welding bead, which does not represent a fault;

FIG. 11 shows a sag of the welding seam with offset wall thicknesses while likewise not representing a faulty weld;

FIG. 12 shows the picture on the screen as it applies to the conditions of FIGS. 10 and 11;

also be possible to differentiate between the different types of flaws. This will now be explained in connection with different examples shown in the drawing.

Figure 2:
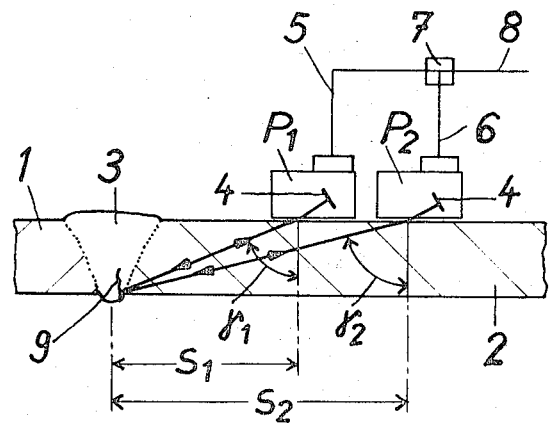
FIG. 2 is a section taken along the line II—II of FIG. 1, showing a tear in the welding seam.

Tears are, as for example the tear 9 in the root of the welding seam of FIG. 2 represent rough surfaces which in most instances have an uneven or zigzag contour. Consequently, each testing head will directly receive back a portion of the emitted sound waves in the form of reflected sound waves and, furthermore, a portion of the sound waves will from each testing head be mirrored to the other testing head. Consequently, three echoes are formed which could occur on the screen at the same time or in quick succession when the testing head combination passes along the welding seam. The amplitudes are sharp and jagged (FIG. 3).

On a smooth surface as, for instance a bonding fault 10 (FIG. 4), a non-welded-through root 11 (FIG. 5), or a non-reached offset root edge 12 (FIG. 6), each test head mirrors sound waves to the other test head. None of the test heads receives its sound waves back directly. Therefore, only one echo is produced which on the screen (FIG. 7) appears at the point $\frac{1}{2}(S_1+S_2)$.

Faulty enclosures such as slag enclosures or pores 13 (FIG. 8) will produce three echoes which differ from the echoes of a tear in that the amplitudes are not sharp and jagged but are wider and relatively low, as clearly shown in the oscillogram of FIG. 9.

Reflection areas caused by a particular shape and not representing any faults, such as crowning of the weld bead or a sag welding seam 14, as shown in FIG. 10 or a sagging weld 15 on opposite wall thicknesses, as shown in FIG. 11, produce 1–2 echoes which are clearly recognizable by the location and shape of the amplitudes. When the testing heads move along the welding seam, the echoes slowly follow each other and replace each other. The relatively narrow and rounded amplitudes as shown in FIG. 12 indicate a flowing course of the curve.

It has been found that the angular testing heads are advantageously arranged relative to each other at an angle $\alpha$ of from 5 to 30°, preferably at an angle of approximately 20°.

With small angles there exists the danger that the sound rays of one testing head are by means of a smooth surface mirrored not only to the other testing head, as it should be, but are partially received again by the emitting testing head and thus simulate a reflection echo as it should appear only on a rough surface. This would naturally make more difficult the proper analysis of the type of the reflecting surface or might make it even impossible. With larger angles, at certain faulty areas, the reflection and the mirroring become so small that the evaluation of the echo is likewise made difficult.

When employing a test head combination comprising two test heads for examining the welding seams, the test heads may be arranged on one of the sides of the welding seam, preferably in such a way that the angle bisector of the angle $\alpha$ extends between the test heads approximately perpendicularly with regard to the longitudinal axis of the welding seam. The two test heads may, however, also be distributed over both sides of the welding seams, and advantageously in such a way that the angle bisector extends approximately coaxially with the longitudinal axis of the welding seam.

It is also possible to employ a plurality of test head combinations. If, for instance, it is intended to examine a welding seam simultaneously from both sides, two testing head combinations may be employed of which one intonates the welding seam from one side while the other test head combination intonates the welding seam from the other side. Similarly, by employing a plurality of test head combinations it is possible at the same time to intonate a plurality of adjacent or superimposed testing zones, for instance for examining the root layer of a welding seam by means of a first test head combination, the superimposed first filling layer of the welding seam by means of a second test head combination, and the second filling layer by means of a third test head combination, etc. The test head combinations may be connected to a common testing device, and when correspondingly spacing the test heads from the testing zone, it is possible from the distance of the screen between the emitting impulse and the echoes, to determine from which test head combination the echo or echoes originate.

In a testing head combination, instead of two testing heads, also additional testing heads may be employed in which instance, in a manner analogous to the above description, the possible number of echoes which may be formed at a reflection area increases, and the number of echoes formed with the various types of faults will be ascertained from the above-outlined laws. This step may be advantageous, for instance, when a testing zone is to be examined simultaneously from two different directions which are offset with regard to each other by 90°. Faults which extend perpendicularly to the direction in which the testing head combination is being moved and which parallel to this direction of movement have no material extension, can in this way sometimes be much better recognized.

The emitting angle to be employed with the testing heads depends in a manner known per se on the thickness of the workpiece to be examined, for instance, on the depth of the testing zone in the workpiece and on the distance at which the testing heads may be arranged from the testing zone. With pipes having a wall thickness of approximately nine millimeters, for instance a test head combination has proved successful which comprisesa 70° angular testing head and an 80° angular testing head, whereas with angular testing heads having emitting angles of 45 and 60° already too many disturbing influences are encountered from the surface of the welding seam.

For instance, in view of differing emitting angles, the different distances of the testing heads from the reflection areas, etc., the echoes received by the testing heads may be of a different strength. For purposes of obtaining good pictures on the picture screen of the testing device, advantageously the sound energies emitted by the testing heads are equalized with regard to each other in such a way that with a reflection on the same reflection area, approximately equally strong echoes will be received from the testing heads so that on the screen there will appear echoes $E_1$ and $E_2$ with at least approximately identical height of amplitude. This may, for instance, be realized in a simple manner by the employment of commercial reducers 16 (FIG. 2a) which precede the testing heads.

Figure 13:
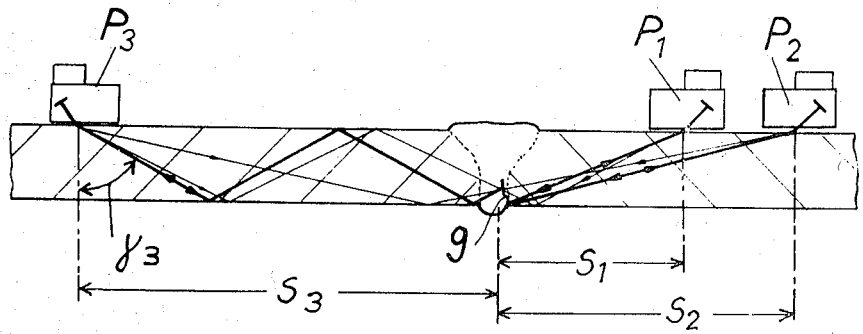
Figure 14:
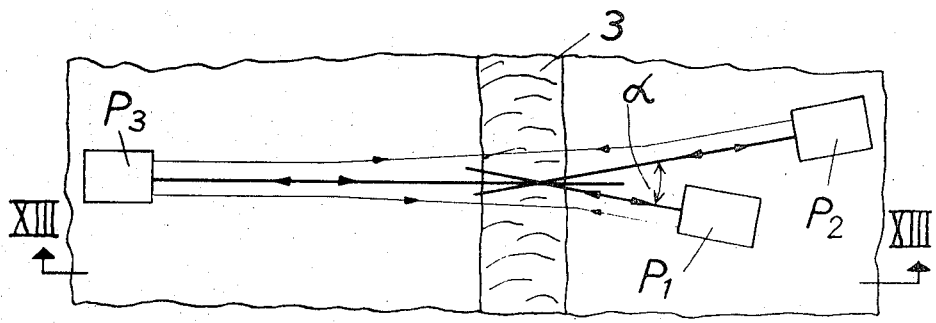
Figure 15:
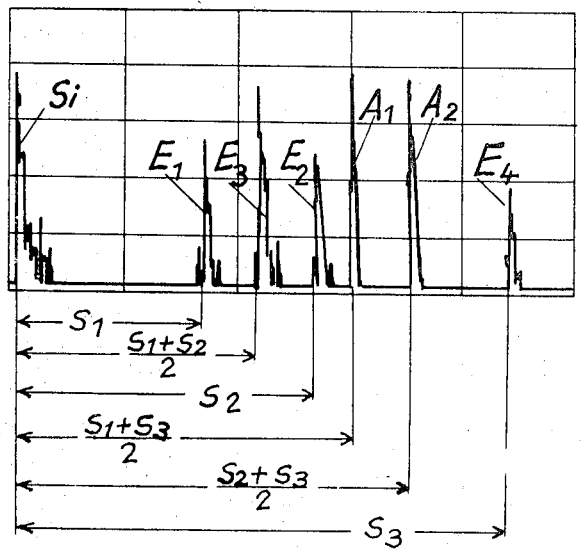
Figure 16:
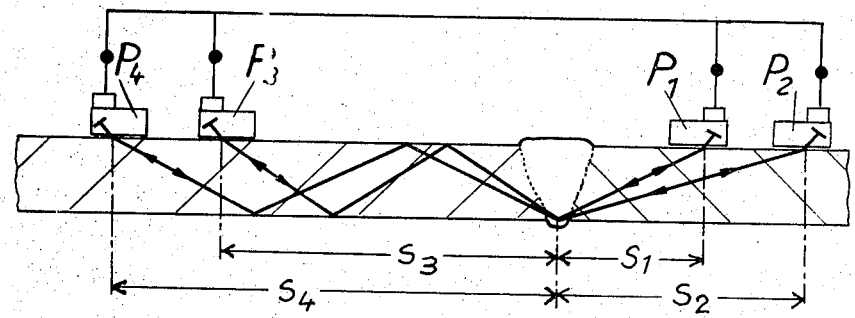
Figure 17:
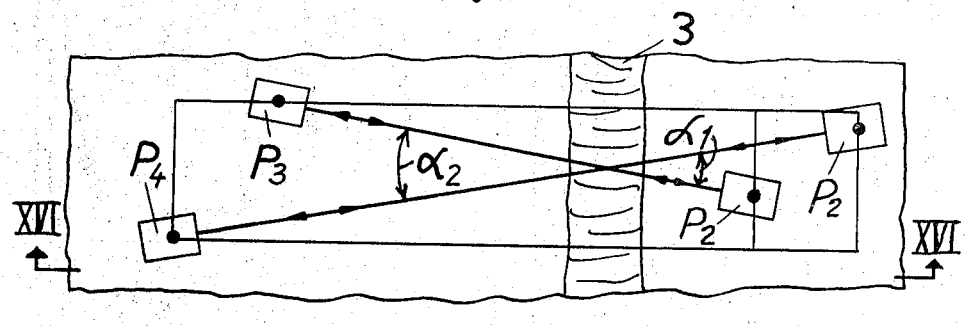
Figure 18:
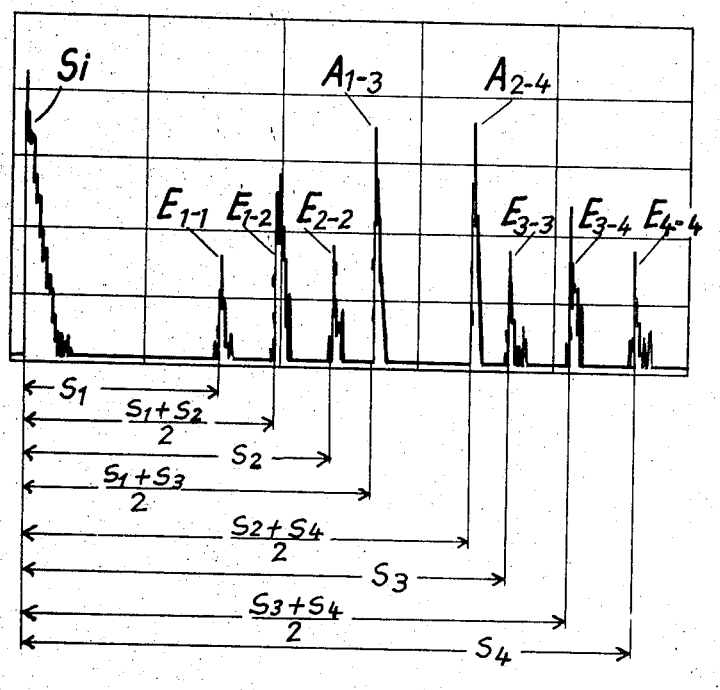
Figure 19:
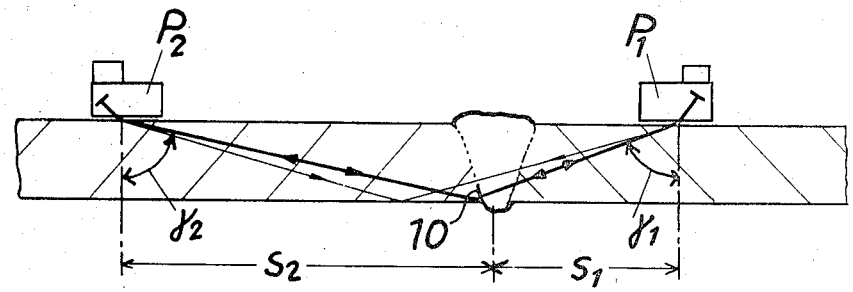
Figure 20:
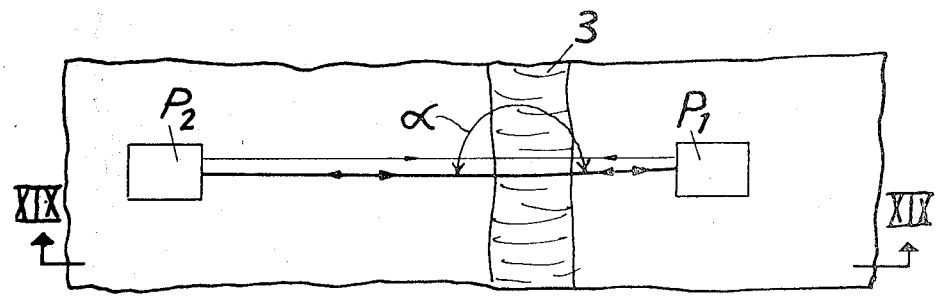

A reliable test result requires a faultless coupling, which means a connection between the test head and the workpiece which connection introduces the sound waves into the workpiece to be examined. A portion of the sound waves emitted by the test head is reflected directly by the surface of the workpiece upon which the testing head is placed so that the sound waves are received again by the test head after a time and stroke which, for all practical purposes is zero and, of course, will produce an amplitude on the screen. This amplitude is not designated as an echo, but is designated as an emitting impulse $S_i$. The emitting impulse $S_i$ thus indicates in the oscillogram merely whether the testing device and the testing heads function normally, but does not indicate whether a coupling prevails. If, behind the testing zone there is located an edge or surface of the workpiece on which sound waves are reflected, the sound waves returning to the testing head will on the screen produce a so-called back wall echo at a distance from the emitting impulse which corresuonds to the distance between the testing head and the workpiece surface. Such back wall echo would represent a continuous coupling control because the back wall echo disappears on the screen when no coupling occurs. If a fault or error prevails in the testing zone, the screen FIG. 13 shows a test head arrangement in section which comprises a combination of three testing heads, said section being taken along the line XIII—XIII of FIG. 14;

FIG. 14 shows a view of the test head arrangement of FIG. 13;

FIG. 15 shows the oscillogram pertaining to FIGS. 13 and 14;

FIG. 16 illustrates in section the present invention in connection with a section through two sheet sections welded together with a combination of four testing heads, said section being taken along the line XVI—XVI of FIG. 17;

FIG. 17 is a top view of FIG. 16;

FIG. 18 is an oscillogram illustrating the examining conditions of the testing device of FIGS. 16 and 17;

FIG. 19 is a section through two sheet metal portions interconnected by a welding seam produced by shielded arc welding, and represents a simplified method according to the invention, the section of FIG. 19 being taken along the line XIX—XIX of FIG. 20;

FIG. 20 is a top view of FIG. 19; and

Figure 21:
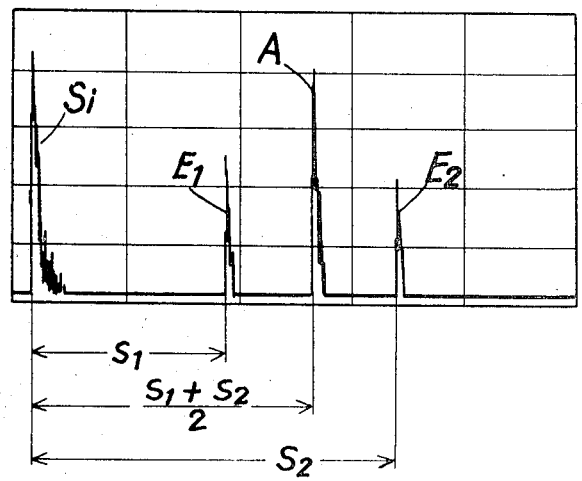

FIG. 21 represents the oscillogram for FIGS. 19 and 20.

The method according to the present invention for testing workpieces, for instance welding seams, by means of ultra-sound waves while employing the impulse-echo method is characterized primarily in that at least two emitter-receiver angular testing heads are arranged at a constant angle with regard to each other and at constant different distances from the testing zone and at emitting angles corresponding to said distances, in such a way that while said heads in the form of a testing head combination are connected to a common testing device, the sound waves emitted by the testing heads after different transmitting times run together in the testing zone at an angle, and that the echoes produced by reflection and/or mirroring and received by the testing heads in different numbers and form corresponding to the type of flaw, are indicated by the common testing device.

Figure 1:
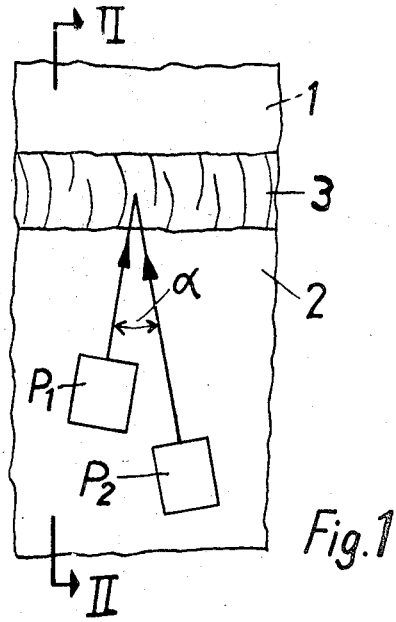
FIG. 1 illustrates by way of example a workpiece comprising two pipe sections in top view interconnected by a welding seam to be tested by a test head combination of two test heads in conformity with the method according to the present invention.

More specifically referring to FIGS. 1–3, it is assumed that the range of the root layer and the first filling layer of the welding seam 3 are to be tested, which welding seam connects two pipe sections 1 and 2. In other words, the testing zone is formed by the lower half or the lower third of the welding seam cross-section. For carrying out the testing operation, a testing head combination is employed which comprises two angular testing heads $P_1$ and $P_2$ with electro-acoustic converters 4. The electric conductors 5 and 6 of the two testing heads are led together in a cable distributor 7 from which a common conductor 8 leads to the testing device, not shown in the drawing. The two angular testing heads $P_1$ and $P_2$ are passed in parallel arrangement to the welding seam 3 and along the latter so that the welding seam will be intonated from the side section-for-section. The two testing heads are arranged with regard to each other at an angle $\alpha$ in such a way that their sound rays come together in the testing zone at an angle $\alpha$ (FIG. 1).

Figure 2A:
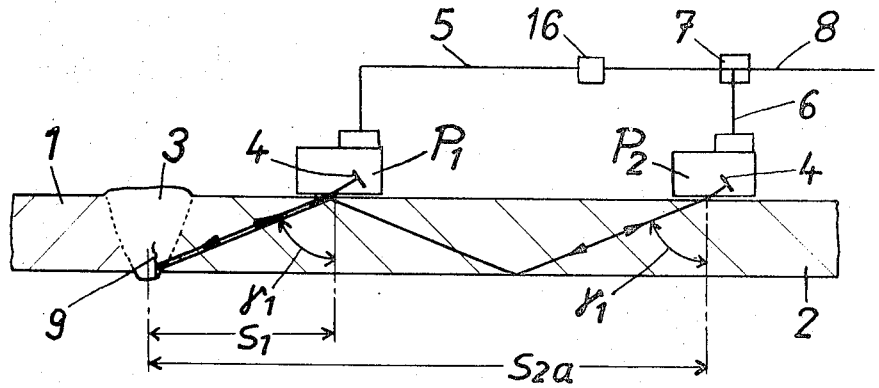
FIG. 2a represents a modification over FIG. 2 primarily with regard to the arrangement of the testing heads.

Furthermore, the two angular testing heads $P_1$ and $P_2$ are arranged at different distances $s_1$ and $s_2$ from the testing zone, i.e. from the welding seam (FIGS. 1 and 2) so that the sound rays of the two testing heads require different transmitting times to the testing zone. In conformity with the different distances, the testing heads have different emitting angles $\gamma_1$ and $\gamma_2$ (FIG. 2) so that the sound rays of the two testing heads will meet each other in the testing zone. Inasmuch as the two testing heads are in the form of a testing head combination connected to a common testing device, also received echoes are indicated in a common oscillogram. As will be clear from FIG. 2a, it is not necessary that the testing heads have different emitting angles. It is merely necessary that the testing heads have different distances from the testing zone and that the testing angles be so adapted or selected in conformity with the distances that the sound rays of the testing heads come ogether in the testing zone. Thus, the testing heads may have also the same emitting angles $\gamma_1$ as shown in FIG. 2a while the distance $s_2a$ of the testing head $P_2$ amounts to a whole multiple of the distance $s_1$ in such a way that its sound ray will, after being deviated a plurality of times by the surfaces of the workpiece, come together in the testing zone with the sound ray of the testing head $P_1$.

The invention is based on the following considerations and findings. As long as in the testing zone there are lacking any reflecting surfaces which could produce an echo, the screen (FIG. 3) will show merely the emitter impulse $S_i$ of the two testing heads. However, as soon as a reflecting surface is located in the testing zone, which surface is able to produce an echo, the following reflections may occur. Sound waves emitted by the testing head $P_1$ may be reflected back to the testing head $P_1$ so that the screen of the testing head will indicate an echo $E_1$. Inasmuch as the transmitting time of the sound waves corresponds to the distance $s_1$ of the testing head $P_1$ from the testing zone, and since this transmitting time is indicated on the screen by the distance of the echo $E_1$ from the emitting impulse $S_i$, also this distance may be designated with the character $s_1$. Furthermore, sound waves emitted by the testing head $P_2$ may be reflected back to the testing head $P_2$. In conformity with the greater distance $s_2$ between the testing head $P_2$ and the testing zone and in conformity with the consequently longer transmitting time of these sound waves, the screen of the testing device will indicate an echo $E_2$ at the distance $s_2$ from the emitting impulse $S_i$. Furthermore, sound waves emitted by the testing head $P_1$ may, by means of the reflecting surface be mirrored to the testing head $P_2$; and, inversely, sound waves emitted by the testing head $P_2$, be mirrored to the testing head $P_1$. The transmitting time of these sound waves corresponds to the distance $$\frac{s_1+s_2}{2}$$

and at this distance there will, therefore, appear a third echo $E_3$ between the echoes $E_1$ and $E_2$. Thus, the method according to the present invention makes possible the production of echoes in different manners, viz. on one hand by reflection of sound waves to the testing head emitting the sound waves, and on the other hand by mirroring of the sound waves emitted by one testing head toward another testing head. This different echo formation will be taken advantage of by the method according to the present invention in such a way that the sound waves for forming the different echoes must require different transmitting times.

The employment of the above-described effect, according to the present invention, is furthermore based on the following considerations and findings: When vertically intonating a smooth surface, the sound waves are reflected whereas when intonating the smooth surface at an incline, the sound waves are laterally mirrored away. On a rough surface the main portion of the sound waves is reflected when the sound waves enter vertically, whereas the remaining portion of the sound waves is mirrored away in different directions. When the sound waves hit the rough surface at an incline or acute angle, the main portion of the sound waves is laterally mirrored away whereas the remaining portion is reflected back to the testing head.

From the number of simultaneously or successively occurring echoes, from the type and manner in which a plurality of echoes follow each other, and also from the height (representing a relative value of the received sound energy) and shape of the amplitudes, the form and surface character of the reflecting surface can be visualized or deduced and this, in turn, permits a conclusion concerning the type of the reflection area. In this way it will be possible with the method according to the present invention to distinguish between reflection areas caused by their shape and reflection areas caused by flaws. It will will, between the emitting impulse and the back wall echo, show fault echo or echoes. Such coupling control requires a sufficiently short distance between the testing head and the workpiece surface, which means that the surface producing the back wall echo must be located relatively closely behind the testing zone because on one hand, the sound intensity decreases with the length of the path over which the sound waves have moved, and since on the other hand the sensitivity of the testing device must be adjusted in conformity with the intensity of the fault echoes. It is furthermore required that the scale on the screen of the testing device be sufficient to permit the appearance on the screen of the back wall echo, which means that the time of transmission of the back wall echo must be proportional to the time of transmission of the fault echoes. These requirements are as a rule not met. As mentioned above, therefore, according to a further development of the method according to the invention, a reliable control possibility should be provided to permit a proper coupling. This problem has been solved according to the present invention primarily by the provision of at least two testing heads located opposite to each other in such a way that with a fault-free workpiece at least one portion of the parcel or beam of emitted sound rays is received by the oppositely located testing head and produces a coupling control echo.

This will now be explained more clearly in connection with the drawing. Corresponding to the illustrations in FIGS. 1, 2 and 3, a test head arrangement is shown in section in FIG. 13. The two testing heads $P_1$ and $P_2$ are arranged in the same manner with regard to each other and to the testing zone formed by a welding seam 3, as has been described in connection with FIGS. 1 and 2. The two testing heads form an angle $\alpha$ of approximately from 5 to 30° with each other. Opposite the two testing heads there is arranged an additional testing head $P_3$ spaced from the testing zone by a distance $s_3$.

The invention is based on the following considerations and findings. The sound rays of the beam emitted by a testing head first extend in a so-called near-field so as to be parallel to each other, whereas subsequently, in the so-called far-field they spread similar to the light rays of a light beam of a search-light. The invention takes advantage of this fact in order to produce a coupling echo which represents a reliable control to the effect that the coupling has been established.

The constant distance $s_3$ of the testing head $P_3$ from the testing zone and its emitting angle $\gamma_3$ corresponding to this distance are so dimensioned that a portion of the sound beam emitted by the testing head $P_3$ is received by the testing heads $P_1$ and $P_2$ (FIGS. 13 and 14). The main ray of the sound beam may pass between the test heads $P_1$ and $P_2$ or may be so mirrored away that it passes in front or in back of the testing heads $P_1$ and $P_2$ to the surface of the workpiece and, therefore, will not be received. It is sufficient, if the testing head $P_3$ is so arranged relative to the testing heads $P_1$ and $P_2$ that marginal rays of its sound beam are received by the testing heads $P_1$ and $P_2$. The sound waves emitted by testing head $P_3$ and received by testing head $P_1$ and, so-to-speak, inversely, also sound waves emitted by the testing head $P_1$ and received by the testing head $P_3$ produce an echo $A_1$ on the screen in the distance $\frac{1}{2}(s_1+s_3)$ from the emitter impulse $S_i$. In the same manner, the echo $A_2$ will by the testing heads $P_3$ and $P_2$ be produced at the distance of $\frac{1}{2}(s_2+s_3)$ (see FIG. 15). These two coupling control echoes $A_1$ and $A_2$ indicate that the coupling of the testing heads $P_1$ and $P_2$ is in order. If now a fault is discovered in the testing zone, the above-described fault echoes $E_1$, $E_2$ and $E_3$ will on the screen appear individually or simultaneously. These fault echoes do not coincide with the two coupling control echoes $A_1$ and $A_2$ because the distances $S_1$, $S_2$ and $S_3$ have been correspondingly tuned to each other. From the faulty area, sound waves of the testing head $P_3$ can be reflected back to the latter so that at the distance $s_3$ there may appear also an additional fault echo $E_4$. Depending on the magnitude of the fault, the course of the rays between the testing head $P_3$ on one hand and the testing heads $P_1$ and $P_2$ on the other hand, decreases or may even be completely interrupted by the faulty area so that the amplitudes of the coupling control echoes $A_1$ and $A_2$ may become lower and may even disappear completely. This, however, is of no significance for the coupling control because now the fault echoes will permit the indication of the prevailing coupling.

The coupling control echoes not only watch over the coupling but also improve the interpretation of the oscillogram, in other words, the differentiation between faults on one hand and reflection areas caused by the shape on the other hand, will be improved. Faults in the testing zone are located in the path of the rays of those sound waves which produce the coupling control echoes and, therefore, automatically bring about a reduction in the amplitude of the control echoes, which is not the case with reflection areas caused by shape. Thus, for instance, a tear can produce the fault echoes $E_1$-$E_4$ shown in FIG. 15. The original height of the two control echoes $A_1$ and $A_2$ illustrated in FIG. 15 must, at least with one of these two echoes, become shorter. Depending on the magnitude of the faulty portion, both control echoes become smaller or even disappear entirely, so that the behavior of the two control echoes also furnishes an additional indication for ascertaining the magnitude of the faults. Echoes $E_1$-$E_4$ of similar form may, however, also be caused by a seam sag, which means by a welding bead with rough surface which protrudes beyond the root of the welding seam. In this instance, the coupling echoes $A_1$ and $A_2$, however, retain their height so that it is very easy to recognize the reflection area due to shape and to distinguish the same from a faulty area.

The coupling control echoes have the further advantage that they permit a simple and easy calibration of the testing device, which means that the height of the amplitudes of the control echoes can be taken as a measurement when adjusting the sensitivity of the testing device. The sensitivity adjustment has heretofore been effected, for instance, on an edge of the workpiece to be examined in order on one hand with occurring faults to obtain on the screen visual echoes with a sufficient height of amplitudes, whereas on the other hand the test sensitivity should be so low that interfering influences will be eliminated or that no amplitudes are produced, for instance, of secondary or negligible faults as, for instance, minute pores.

FIGS. 16–18 illustrate a further device according to the present invention the test head arrangement of which is particularly advantageous in connection with the examining of welding seams. On one side of the welding seam 3, similar to the embodiment of FIGS. 13–15, the two testing heads $P_1$ and $P_2$ are arranged at an acute angle with regard to each other. Opposite said testing heads $P_1$ and $P_2$ on the other side of the welding seam 3 there are two additional testing heads $P_3$ and $P_4$ which are likewise arranged at an acute angle with regard to each other. The angles $\alpha_1$ and $\alpha_2$ between the testing heads $P_1$ and $P_2$ and $P_3$ and $P_4$, the distances $s_1$, $s_2$, $s_3$ and $s_4$ of the testing heads from the testing zone, and the radiating angles of the testing heads are so selected that coupling control echoes and fault echoes can be produced in the following manner. If the testing zone is free from faults, the testing heads $P_1$ and $P_3$ mutually mirror to each other the main ray or the marginal rays of their sound beam without, however, affecting the two other testing heads $P_2$ and $P_4$. In the same manner, the testing heads $P_2$ and $P_4$ mirror each other crosswise. In this way, the testing heads $P_1$ and $P_3$ produce the coupling control echo $A_{1-3}$, and the testing heads $P_2$ and $P_4$ produce the control echo $A_{2-4}$.

When a fault is encountered, the testing heads $P_1$ and $P_2$ can again produce up to three fault echoes and specifically, the fault echo $E_{1-1}$ is produced by reflection or $P_1$ to $P_1$, whereas the echo $E_{2-2}$ is produced by reflection from $P_2$ to $P_2$, and finally, the echo $E_{1-2}$ is produced by mutually mirroring of $P_1$ and $P_2$. In the same manner, the testing heads $P_3$ and $P_4$ can produce the fault echoes $E_{3-3}$, $E_{4-4}$ and $E_{3-4}$. To the extent to which the faulty area reduces the crosswise mirroring, the two coupling control echoes become smaller or disappear completely. This testing arrangement thus makes it possible, by simultaneously intonating a welding seam from both sides, further to improve the indication of the oscillogram, and does so for determining the type, magnitude, and location of the faults as well as in particular for the distinction between faults and reflection areas caused by the shape, and not representing any faulty areas.

Experience in connection with shielded arc welding has proved that faults occurring in the welding seam with this type of welding are primarily bonding faults. With workpieces of this type with which the occurring faults are almost always of the same type, the differentiation of the types of faults might be secondary and the emphasis may be on the indication of the oscillogram showing the differentiation between faults and reflections caused by the shape of the article, as well as the control of the coupling.

FIGS. 19–21 illustrate a test combination representing a simplification of the method according to the invention under the above-outlined conditions. The testing heads $P_1$ and $P_2$ are located opposite to each other and at both sides of the welding seam 3. Their different distances $s_1$ and $s_2$ from the testing zone, their radiating angles $\gamma_1$ and $\gamma_2$ corresponding to the distances, and the angle $\alpha$ therebetween which may be 180° or approximately 180° are so tuned upon each other that the testing heads mutually mirror to each other marginal rays which produce a coupling control echo A. The main rays of the two testing heads, on the other hand, respectively pass by the other testing head and cannot be received.

When at the testing zone a bonding fault 10 occurs, one or two fault echoes $E_1$ and $E_2$ may be produced due to the fact that the main ray from $P_1$ impacting upon the bonding fault area practically vertically, is reflected back on the smooth surface to $P_1$ and the echo $E_1$ is produced. Similarly, the main ray from $P_2$ may be reflected. The greater the fault area, the greater may be the fault echoes and the smaller will be the coupling control echo A which disappears completely when the fault area interrupts the mirroring of the marginal rays.

If it should happen that another flaw is encountered, for instance a tear, this flaw can sufficiently precisely be distinguished by the form of the amplitudes as well as by the behavior during the movement of the test head condition. If, however, the fault echoes are produced by a shape-formed reflection area, this will be distinguishable in view of the fact that the mirroring of the marginal rays, and thus the coupling control echo, will not be affected.

For carrying out the method according to the invention, a device may be employed in which the testing heads are journalled in a Cardanic suspension on a common test head carrier. This device will permit guiding the test head carrier over the workpiece, for instance parallel to a welding seam, in such a way that all test heads will always have the proper distance from the testing zone in conformity with their radiating angle, and that the angle at which the testing heads are arranged with regard to each, will not be changed. This is made possible by the universal joint mounting of the test heads in the test head carrier so that when unevenness of the surface of the workpiece is encountered, it will be assured that the coupling will be maintained and no faults can occur by an interruption of the sound-conducting connection between the test heads and the workpiece. If desired, a plurality of test head combinations may be installed in the test head carrier. Thus, for instance, two test head combinations may be provided for examining a welding seam simultaneously from both sides.

It is, of course, to be understood, that the present invention is, by no means, limited to the particular embodiments set forth above, but also comprises any modifications within the scope of the appended claims.

What I claim is:

1. A method of non-destructively examining workpieces, especially welding seams, as to defects, by means of ultra-sound waves according to the impulse echo system, which includes the steps of: arranging at least two ultra-sound emitter-receiver angular testing heads at a substantially constant angle relative to each other and at respectively substantially constant different distances from the workpiece zone to be examined, sending ultra-sound waves from said testing heads at emitting angles corresponding to said different distances into the workpiece zone to be examined while so spacing said testing heads from said zone and so emitting the sound waves at the said emitting angles that the sound waves emitted from said testing heads meet in said zone at an angle and require different transmitting times for passing from the respective testing head to said zone, moving the workpiece and testing heads relative to each other in a direction substantially parallel to the workpiece zone, connecting said testing heads forming a testing head combination to a common recording device, and recording thereon the echoes received by said testing heads from the respective workpiece zone, said echoes being received in different numbers and corresponding to the type of defect in said zone and being at least one of the three types of echoes produced merely by reflection, echoes produced merely by mirroring, and echoes produced by reflection and mirroring.

2. A method according to claim 1, which comprises the step of arranging said testing heads at an angle of from 5° to 30° relative to each other.

3. A method according to claim 1, comprising the step of arranging said testing heads at an angle of approximately 20° relative to each other.

4. A method according to claim 1, comprising the step of arranging at least two testing heads opposite to each other in such a way that in response to no defect being discovered in the workpiece zone being examined at least a portion of the sound waves emitted from either one of said testing heads is received by the respective opposite head and produces a coupling control echo.

5. A method according to claim 3, which comprises the steps of: arranging two testing heads at an acute angle to each other, and arranging a third testing head opposite to said first two testing heads, said third testing head being operable to mirror sound waves from said third testing head to each of said two other testing heads.

6. A method according to claim 4, which comprises the steps of: arranging two testing heads at an acute angle to each other, and arranging two additional testing heads opposite said first two testing heads and at an acute angle to each other, said four testing heads being so arranged with regard to each other as to be operable to mirror crosswise sound waves from said first two testing heads to said additional two testing heads and vice versa.

7. A method according to claim 1, which includes the steps of tuning the sound energy emitted by the testing heads in such a way that at a reflection at the same reflection area the testing heads will receive echoes of at least approximately equal strength.

References Cited

UNITED STATES PATENTS 3,313,146   4/1967   Krautkramer _____ 73—67.8

FOREIGN PATENTS 716,687   10/1954   Great Britain _____ 73—67.7

JAMES J. GILL, Primary Examiner

UNITED STATES PATENT OFFICE
CERTIFICATE OF CORRECTION

Patent No. 3,552,191          Dated January 5, 1971

Inventor(s)    Josef Heseding

It is certified that error appears in the above-identified patent and that said Letters Patent are hereby corrected as shown below:

In the drawing, sheet 4, the emmitter-receiver $P_2$ neare the welding seam in Fig. 17, should be designated -- $P_1$ --.

Column 12, line 48, claim reference numeral "3" should read -- 4 --.

Signed and sealed this 1st day of August 1972.

(SEAL)
Attest:

EDWARD M. FLETCHER, JR.          ROBERT GOTTSCHALK
Attesting Officer                  Commissioner of Patent